(12) United States Patent
Kosaka et al.

(10) Patent No.: US 6,188,819 B1
(45) Date of Patent: Feb. 13, 2001

(54) WAVELENGTH DIVIDING CIRCUIT

(75) Inventors: Hideo Kosaka, Tokyo; Shojiro Kawakami, Miyagi, both of (JP)

(73) Assignee: NEC Corporation, Tokyo (JP)

( * ) Notice: Under 35 U.S.C. 154(b), the term of this patent shall be extended for 0 days.

(21) Appl. No.: 09/271,824

(22) Filed: Mar. 18, 1999

(30) Foreign Application Priority Data

Mar. 20, 1998 (JP) .................................................. 10-092426

(51) Int. Cl.[7] .................................................... G02B 6/26
(52) U.S. Cl. ................................ 385/39; 385/15; 385/24; 385/115
(58) Field of Search ................................ 385/39, 11, 14, 385/15, 16, 24, 115, 48, 49

(56) References Cited

U.S. PATENT DOCUMENTS 5,940,548 * 8/1999 Yamada et al. ........................ 385/15

FOREIGN PATENT DOCUMENTS 7-117612    12/1995 (JP) .

OTHER PUBLICATIONS

1992 Denshi Joho Tushin Gakkai Autumn Meeting Yokoshu, vol. 4, p. 272.

Optics Letters, vol. 21, No. 21, Nov. 1, 1996, Shawn–Yu Lin et al., "Highly Dispersive Photonic Band–Gap Prism".

* cited by examiner

Primary Examiner—Phan T. H. Palmer
(74) Attorney, Agent, or Firm—Scully, Scott, Murphy & Presser

(57) ABSTRACT

A wavelength dividing circuit which realizes improved device characteristics and performance, such as a small size, high speed and high transmission efficiency and which lends itself to improved integration degree. A wavelength dividing circuit in which materials of different refractive indices are arrayed periodically, without forming individual waveguides as in conventional AWG, in order to create strong wavelength dispersion characteristics not possible with an ordinary optical crystal to control wavelength deviation. A substrate 1 having atomic mediums 5 buried in a background medium 4 in a two-dimensional triangular array has its both sides sandwiched by a first clad 2 and a second clad 3. Optical signals fall on an incident surface inclined at a certain angle relative to the light incident direction and is radiated from a light outgoing surface 7. The interval between neighboring atomic mediums 5 is designed in meeting with the wavelength of the optical signals, while the thickness of the substrate 1 is designed so that the optical signals are sufficiently confined in the substrate 1 and so that the light proceeding direction is not significantly deviated from the substrate surface.

15 Claims, 13 Drawing Sheets

WAVELENGTH DIVIDING CIRCUIT

FIELD OF THE INVENTION

This invention relates to an optical integrated circuit and, more particularly, to a planar type optical integrated circuit used in optical communication or optical control and which may be used with advantage for wavelength multiplexing optical transmission system.

BACKGROUND OF THE INVENTION

In the waveform multiplexing optical transmission system, a device is indispensable which splits plural wavelength multiplexed signal light beams into separate wavelength light beams, or which combines plural signal light beams into a sole wave guide path. As a device having such functions, a device employing an array waveguide lattice, referred to hereinafter as array wave guide (AWG), is felt to be promising. As an example of the AWG, a planar structure of an AWG disclosed in Takahashi et al, Meeting Abstracts to Autummn Meeting of the Society of Electronic Information Communication, Vol.4, page 272, is shown in FIG. 13.

In this AWG element, shown in FIG. 13, a quartz based light guide path is formed on a waveguide substrate, formed by a Si substrate. There are provided 11 input light waveguide paths 52, an inputside star coupler 53, as a recessed slab waveguide path, an array waveguide lattice 54, an output side star coupler 55, and an output waveguide path 56. Plural signal light beams of different wavelengths, entering one of the 11 input light waveguide paths 52, are subjected to phase shift determined by the wavelength by the array waveguide lattice 54 so as to be output at different output ports. Thus, it is possible to split the wavelength multiplexed signal light beams.

Takahashi et al manufactured a wave synthesizer/splitter, using 41 array waveguide lattices, in a 1.5 μm wavelength band, with a frequency interval of 10 GHz and 11 channels, to achieve characteristics with −14 dB crosstalk, an insertion loss of 8 dB and a 3 dB transmission bandwidth of 6.5 GHz. The specific refractive index difference is 75%, with a substrate size being 4 cm by 56 cm. Meanwhile, a similar AWG device is disclosed in, for example, JP Patent Kokoku JP-B-7-117612.

SUMMARY OF THE DISCLOSURE

However, in the course of the investigations toward the present invention the following problems have been encountered. Namely, the above-described conventional AWG device has the following disadvantages.

The first problem is the increased device size. The reason is that a waveguide path needs to be provided separately in each path of light, with there being placed limitations on the bending radius of each waveguide path.

The second problem resides in difficulties met in reducing the crosstalk. The reason is that leakage of optical signals occurs to a certain extent unavoidably even if the differential refractive index between a core and a clad constituting a waveguide channel is increased, while the waveguide pitch cannot be set to a sufficiently large magnitude because of the above-mentioned device size limitations.

It is therefore an object of the present invention to provide a wavelength dividing circuit suitable for high integration through reduction in the device size and improved device characteristics or performance, such as high speed or high transmission efficiency.

Further objects of the present invention will become apparent in the entire disclosure.

According to an aspect of the present invention there is provided a wavelength dividing circuit in which a substrate itself is endowed with wavelength deflection characteristics without forming a waveguide path for each of the wavelengths. More specifically, in the wavelength dividing circuit of the present invention, a periodic structure comprised of mediums of different refractive indices is formed generally in a two-dimensional lattice structure.

According to a second aspect, there is provided a wavelength dividing circuit, wherein mediums with different refractive indices are periodically arrayed in an entire waveguide area to create wavelength dispersion characteristics not found in usual optical crystals, the wavelength dispersion characteristics being controlled (or defined) to split the wavelength.

The wavelength dividing is performed by using a "heavy photon" state exhibiting strong dispersion among the wavelength dispersion characteristics.

The waveguide region is within a substrate, and the wavelength dispersion characteristics are controlled by arranging materials with different refractive indices in a two-dimensional periodic array.

The two-dimensional periodic array is in the form of a triangular lattice to create the "heavy photon" state.

The difference in the refractive index is created by providing the substrate with a two-dimensional periodic array of through-holes.

According to a third aspect, there is provided a wavelength dividing circuit, wherein a waveguide region having wavelength distribution anisotropy of the refractive index by two-dimensionally arranging in a background medium a plurality of mediums having a refractive index different from that of the background medium at a predetermined pitch so that the incident light to the waveguide region has its transmission path changed in dependence upon the wavelength.

According to a fourth aspect, there is provided a wavelength dividing circuit wherein a plurality of mediums having refractive indices different from that of a substrate are arranged in the form of a two-dimensional lattice as viewed from the surface of the substrate to endow the substrate itself with wavelength deflection characteristics so that the light incident on the substrate has its transmission path changed within the substrate in dependence upon the wavelength.

PREFERRED EMBODIMENTS OF THE INVENTION

The present invention will be explained with reference to its preferred embodiments. In its preferred form, a wavelength dividing circuit of the present invention has, in its substrate itself, a periodic structure which is made up of mediums of different refractive indices in an overall two-dimensional lattice configuration. By the periodic structure of the substrata, two-dimensional photonic crystals are formed to realize anisotropy in refractive index dispersion.

By this anisotropy in the refractive index dispersion, plural light beams of different wavelengths incident on the same entrance path are propagated in different proceeding paths. That is, a behavior comparable to prism effects of usual optical crystals is achieved.

This photonic crystal can be used in actual devices in that it can realize deflection properties significantly larger than those with usual optical crystals without being accompanied by absorption.

Figure 1:
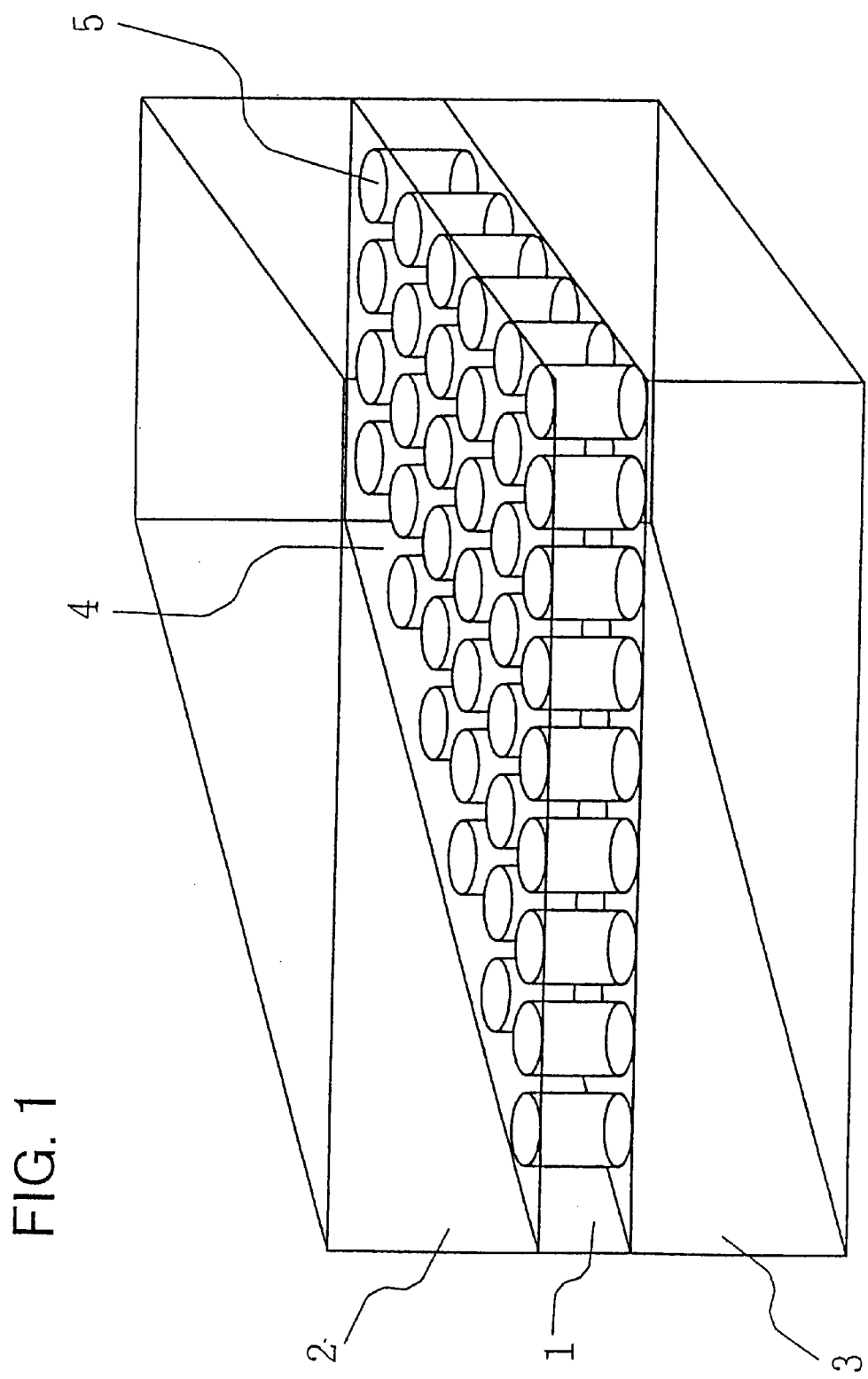
FIG. 1 shows a schematic structure of a wavelength dividing circuit embodying the present invention.

Referring to the drawings, a preferred embodiment of the present invention is explained. FIG. 1 is an exploded schematic perspective view showing a structure of a present embodiment of a wavelength dividing circuit according to the present invention.

Referring to FIG. 1, showing a present embodiment of the wavelength dividing circuit according to the present invention, there is shown a substrate 1 sandwiched between a first clad 2 and a second clad 3. The substrate 1 has such a structure in which atomic mediums 5 are periodically buried or embedded in a two-dimensional, triangular arraying configuration in a background medium 4.

Figure 2:
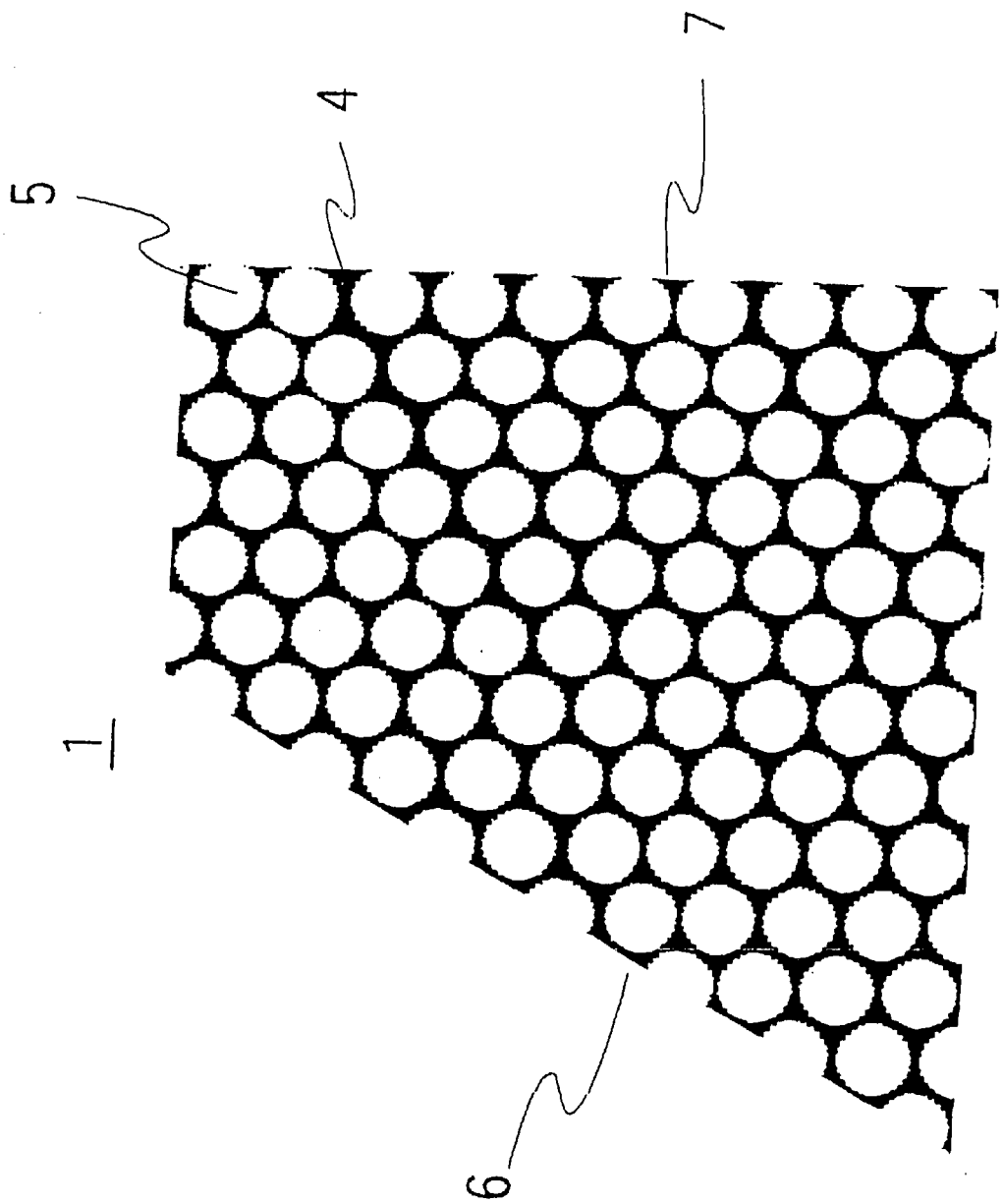
FIG. 2 schematically shows the cross-section of a substrate in an embodiment of the wavelength dividing circuit of the present invention.

FIG. 2 shows a plan configuration of the substrate 1 with the section being parallel to the substrate surfaces facing the clads. Referring to FIG. 2, an incident surface 6 of light signals is inclined at a defined angle relative to the light incident direction, and the light signals emit out of an outgoing surface 7.

The separation between neighboring atomic mediums 5 is designed in koping with the wavelength of the optical signals, with the substrate 1 being designed to be thick enough to confine the optical signals within the substrate 1, with the light proceeding direction then being not deviated significantly from the substrate surface.

The operation of the present embodiment is hereinafter explained with reference to FIG. 10.

A wavelength multiplexed incident light beam 8 which has entered the substrate 1 is wavelength demultiplexed to proceed as a propagating light beams 9, each separated per wave length. Outgoing light beams 10 are emitted at substantially an equal interval as shown. The underlying principle is explained in detail in connection with the following examples.

EXAMPLES

Figure 3:
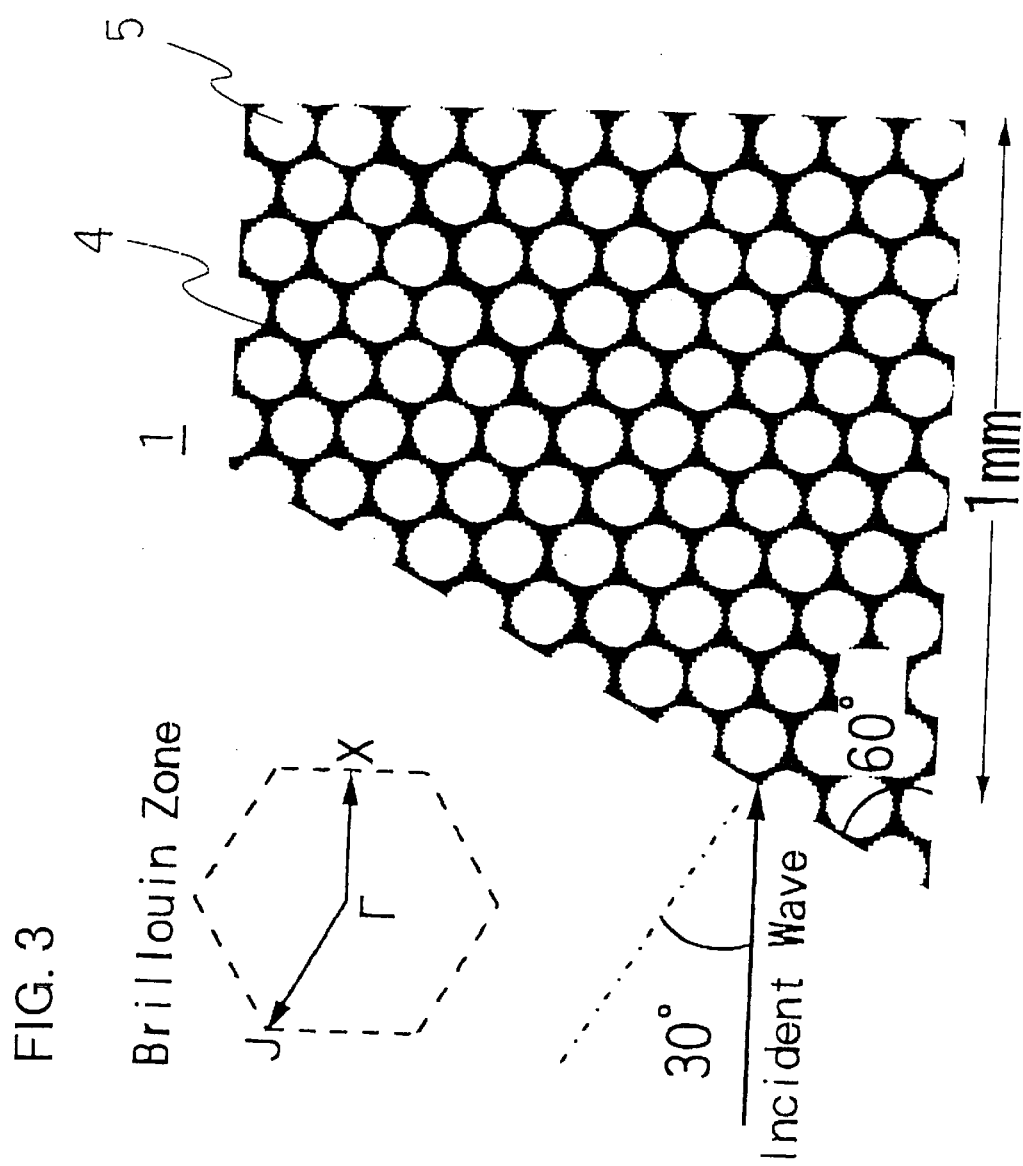
FIG. 3 schematically shows the cross-section of a substrate for illustrating an embodiment of the present invention.

Referring to the drawings, preferred examples for carrying out the present invention are explained. FIG. 3, showing an example of the present invention, shows a substrate as a sectional view taken in a plane parallel to the substrate surface facing the clad. Meanwhile, the overall structure of the wavelength dividing circuit embodying the present invention is the same as that shown in FIG. 1.

Referring to FIG. 3, a background medium 4 and atomic is mediums 5 in the substrate 1 are silicon (Si) and air, respectively. That is, the substrate 1 is a Si substrate having through-holes.

The substrate 1 has a thickness of 1.9 $\mu$m, with the atomic mediums 5 each being round columnar in shape. The openings are each 0.77 $\mu$m in diameter, with an aspect ratio being 2.6. With this aspect ratio, the through-holes representing the atomic mediums 5 can be produced also by an etching process. The arraying pitch of the atomic mediums 5 is 0.83 $\mu$m.

On both sides of the substrate 1, SiO$_2$ plates of a thicknesses sufficient to serve as clads 2, 3 are bonded, as shown in FIG. 1.

The crystal arraying is in the form of a triangular lattice, as shown in FIG. 3, with the light incident surface being a J-surface, that is a surface perpendicular to the J-point direction of an inverted lattice space shown in FIG. 3, with a light outgoing surface being an X-plane (see the Brillouin zone in FIG. 3). The crystal length is 1 mm.

The operation of the example is hereinafter explained.

1. <Photonic Band Structure>

Figure 4:
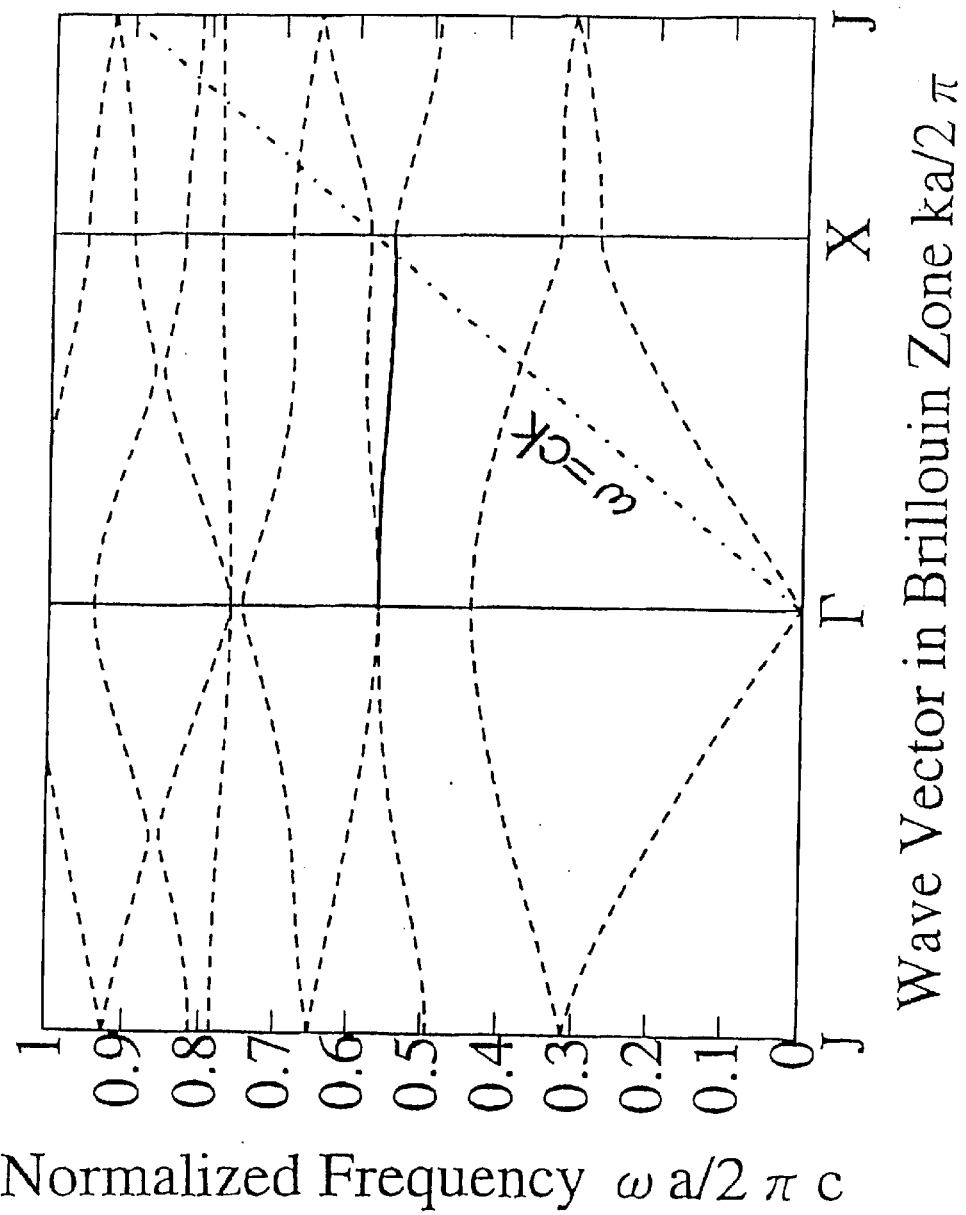
FIG. 4 shows the photonic band structure obtained in the wavelength dividing circuit for illustrating an embodiment of the present invention.

The photonic band structure obtained with this crystal structure, shown in FIG. 3, is shown in FIG. 4. Here, only the TM mode in which the light polarizing plane of the magnetic field is in a Si plane is shown and taken as an example for explanation.

Figure 5:
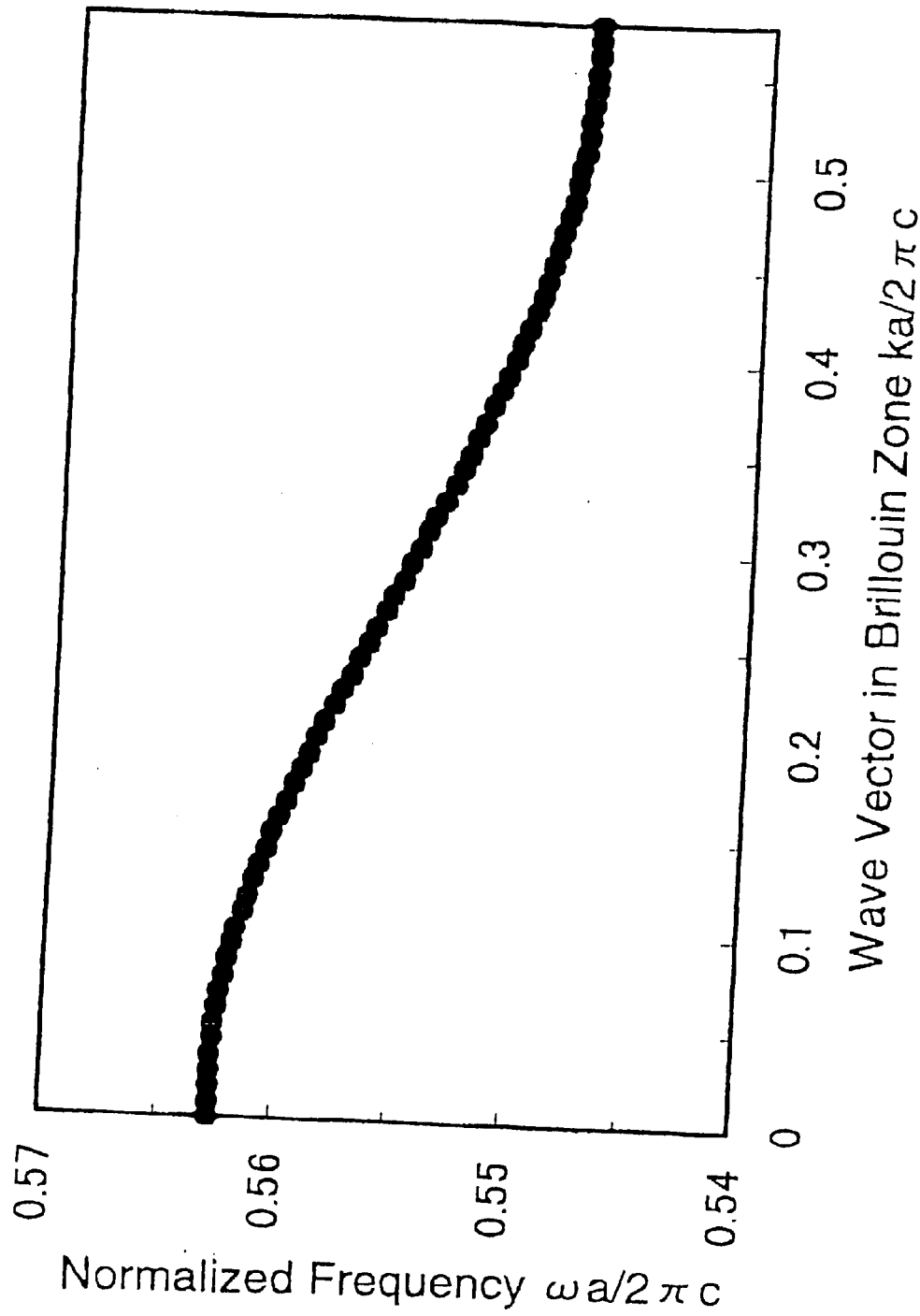
FIG. 5 shows details of the state of dispersion of the third branch from the bottom of a region between Γ and X used for analysis, for illustrating an embodiment of the present invention.

Referring to FIG. 4, a chain-dotted line indicates a dispersion line of the light incident from vacuum ($\omega$=ck) and which intersects the dispersion curve in the crystal at two points between $\Gamma$ and X. Here, the third branch from the bottom, having a smaller differential coefficient, is used. This branch is termed "heavy photon" because of its similarity to an electronic system. FIG. 5 shows this branch in detail to an enlarged scale.

2. <Wavelength Dispersion Characteristics>

Figure 6:
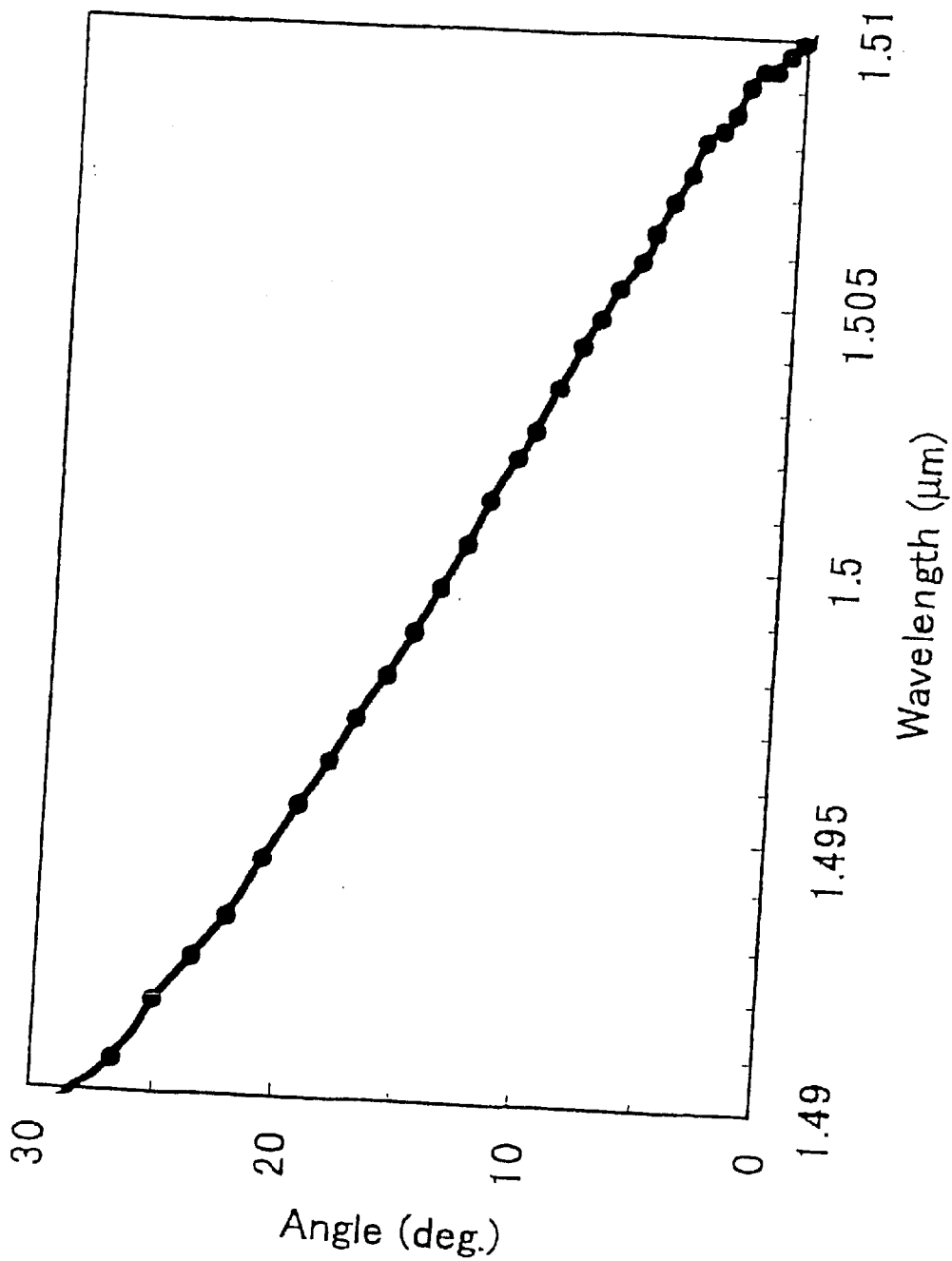
FIG. 6 shows the wavelength dependency of the refractive index for illustrating an embodiment of the present invention.
Figure 8:
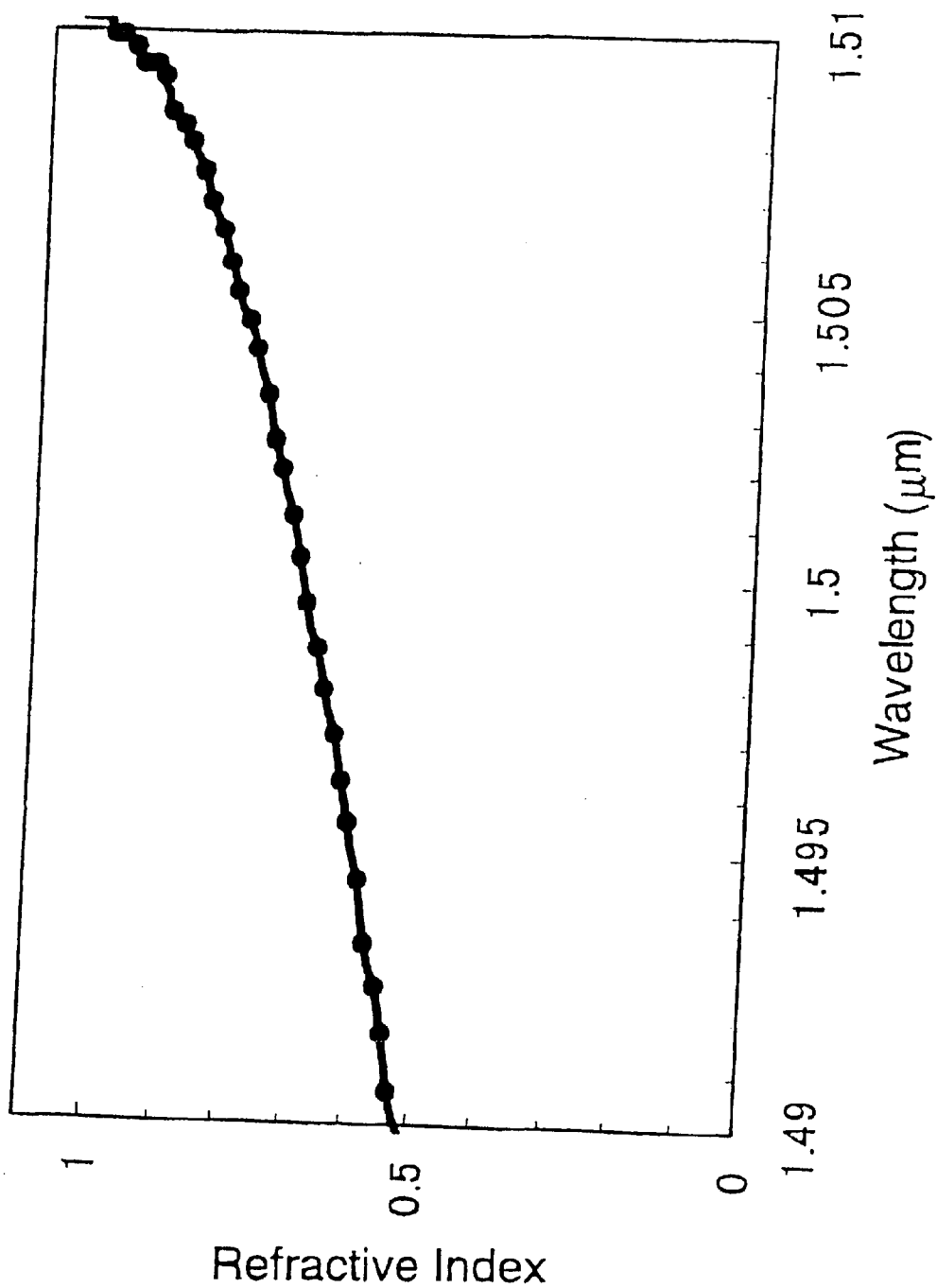
FIG. 8 shows the wavelength dependency of the radiating point of the propagated light, for illustrating an embodiment of the present invention.
Figure 9:
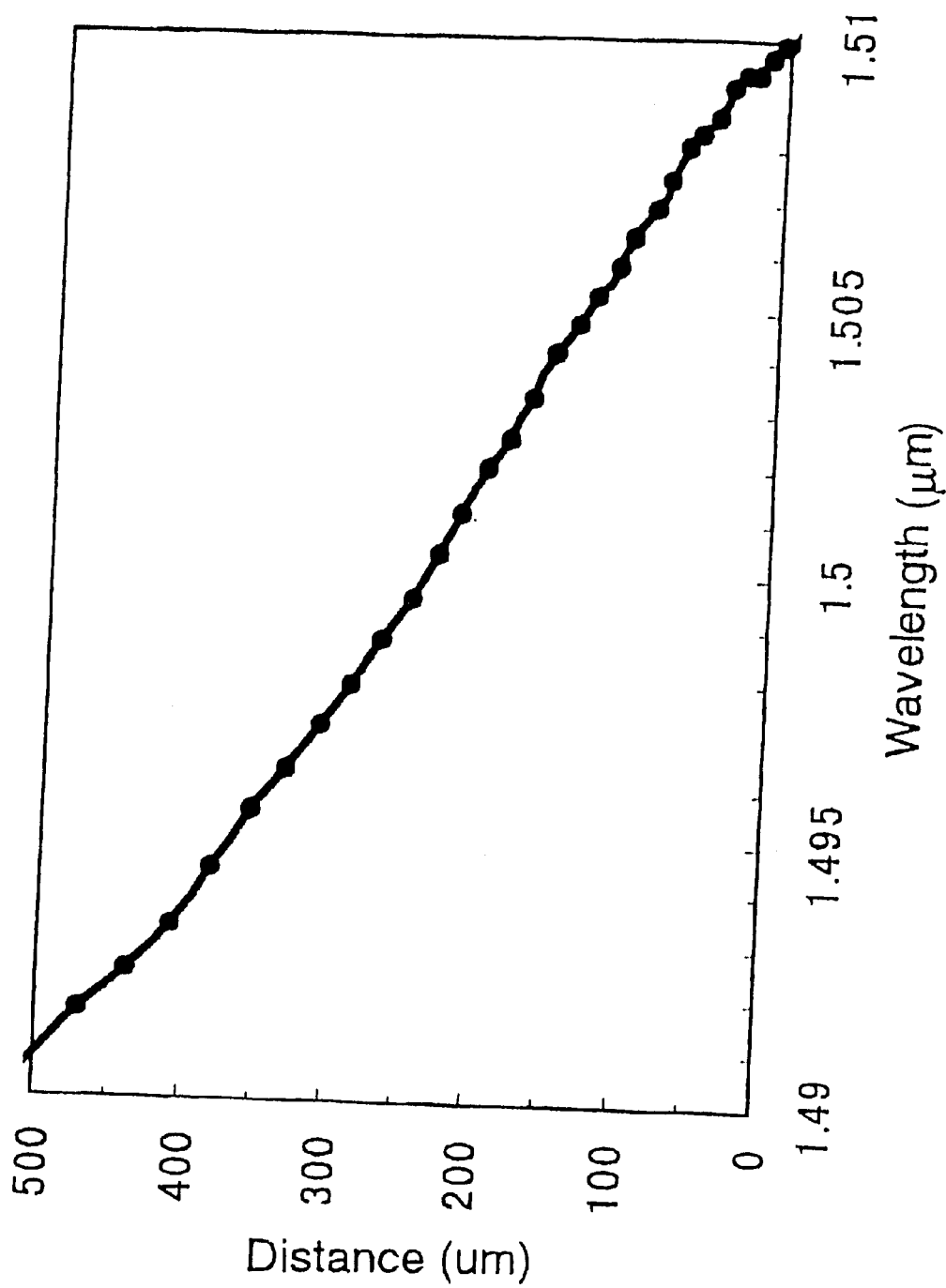
FIG. 9 shows the wavelength dependency of transmissivity of the incident lighting to a crystal.

From this relation of dispersion, the wavelength dependency of the refractive index is found. From this, the beam propagation characteristics in the crystal are found. FIGS. 8 and 6 show the wavelength dependency of the refractive index and the wavelength dependency of the propagation angle, respectively. FIG. 9 shows the spatial distribution at an outgoing end of the crystal length of 1 mm, with the distance in $\mu$m being plotted on the ordinate. Referring to FIG. 9, substantially linear spatial distribution characteristics, centered about the wavelength of 1.5 $\mu$m, with a distribution width of 500 $\mu$m corresponding to one-half the crystal length.

The wavelength dependency of the refractive index n is from the relation of $$\omega = ck/n \qquad (1)$$

$$n = \frac{ka/2\pi}{\omega a/2\pi c} \qquad (2)$$

so that the refractive index n is obtained from a reciprocal of the gradient of FIG. 5.

By the Snel's equation, the beam propagation angle θ2 of beam propagation in the crystal is found by the following equation (3):

$$\theta_2 = \sin^{-1}\left(\frac{\sin\theta_1}{n}\right) - 30 \qquad (3)$$

From this, the spatial distribution shown in FIG. 9 is obtained.

From the relation with respect to the refractive index n, the wavelength dependency of the transmissivity T of the incident light into the crystal is given by the following equation (4):

$$T = \frac{4n}{(n+1)^2} \qquad (4)$$

Figure 7:
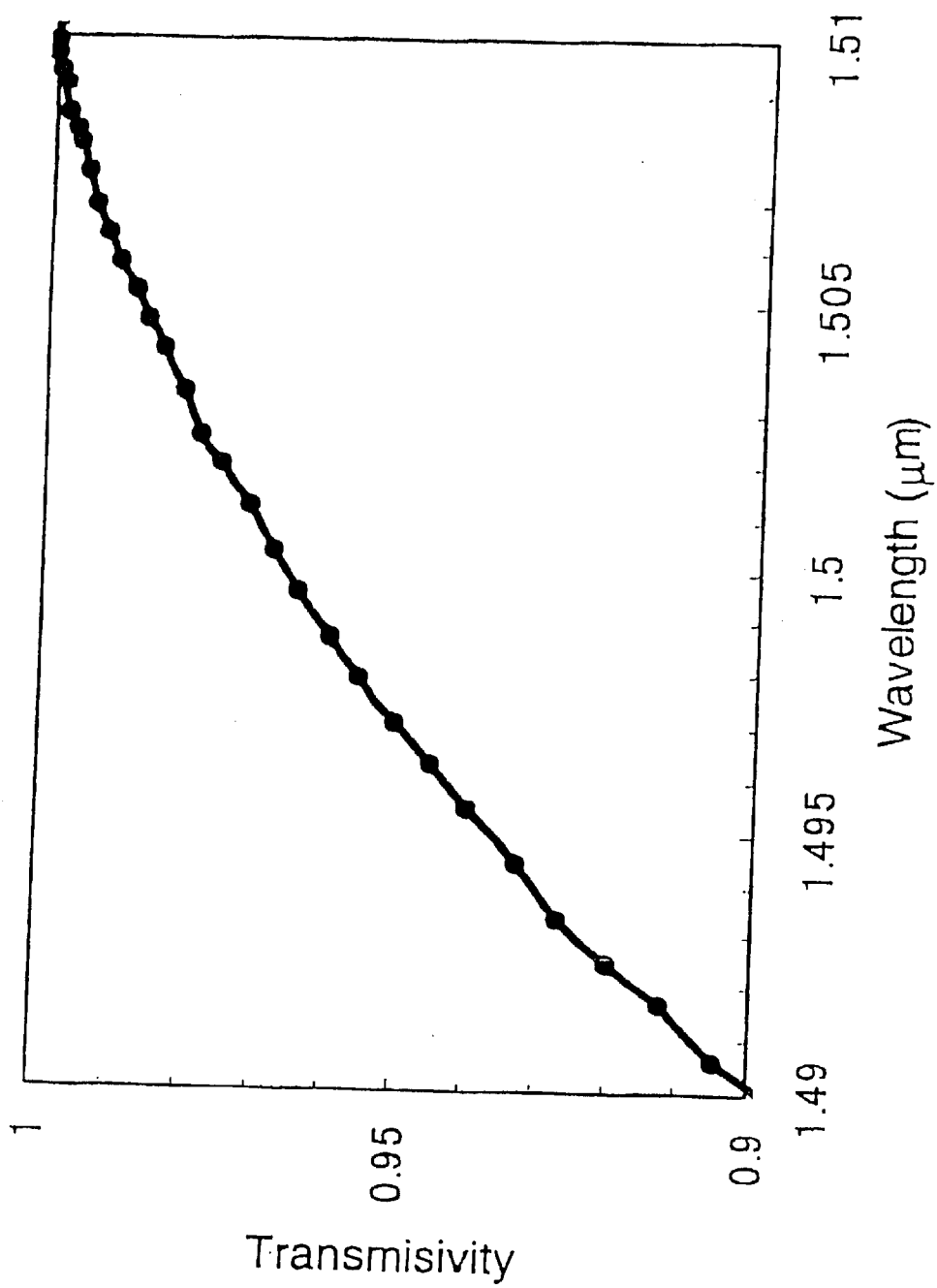
FIG. 7 shows the wavelength dependency of a propagation angle of the light propagated in a crystal, for illustrating an embodiment of the present invention.

The more the point of intersection with the incident light dispersion shown by a chain dotted line of FIG. 4 is approached, the higher is the transmissivity. The results of calculations indicate that the transmittance is not less than 90% in the total wavelength range of from 1.49 μm to 1.51 μm, as shown in FIG. 7.

Figure 10:
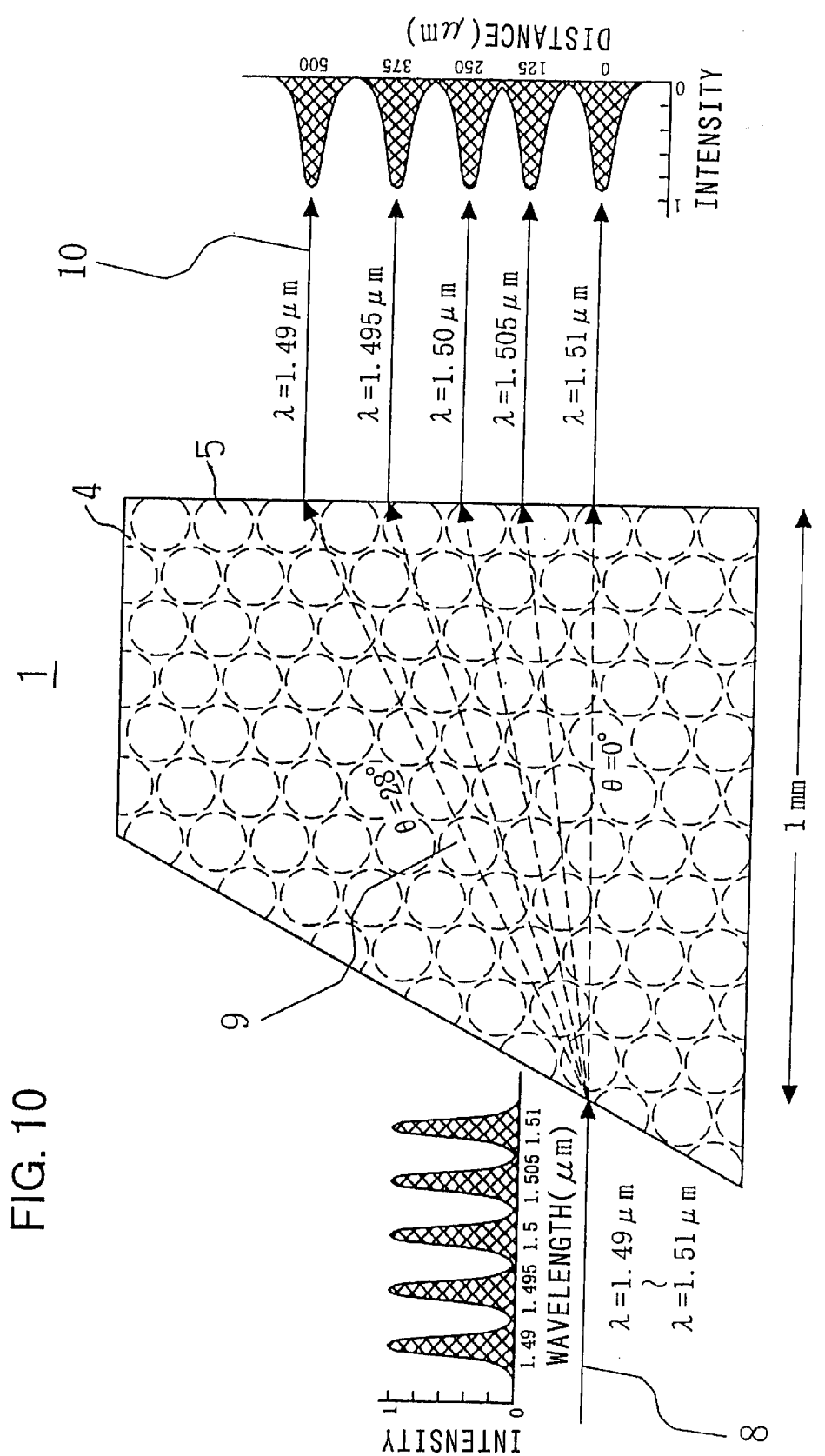
FIG. 10 shows the manner of propagation in space for illustrating an embodiment of the present invention.

Based on the above results, taken collectively, the state of spatial distribution is shown in FIG. 10. Referring to FIG. 10, if the fibers are arranged at an outgoing end at a 125 μm pitch, and five waves are introduced into the waveguide path, with the pitch being 25 μm, there may be realized a 25-wave WDM(wavelength division multiplexing) splitter.

Strictly, the angle of incidence differs from the propagation angle in the crystal, so that it is necessary to reflect the band structure in the actual propagation direction. However, in a triangular lattice, the band structure is substantially isotropic so that an approximately correct solution is obtained.

3. <Substrate Thickness Conditions>

In order that the photonic crystal of a slab structure can be handled as a two-dimensional system, it is necessary that the light wave can be approximated as being a planar wave. That is, the propagation angle of the light wave should not be deviated excessively from the in-plane direction. Since it is crucial for the refractive index difference to be large in order to form photonic bands, no favorable results can be realized with a weak light confinement in the slab because of effective averaging. These need to be taken into account in deriving optimum slab thicknesses. Strictly, the three-dimensional structure needs to be accurately utilized. However, in the present invention, the variable separation is assumed to be possible, and the following is approximately presupposed:

light confinement ratio in the slab is not less than 0.7;
TE-TM mixing due to deviation from the in-plane direction of the propagation angle is not larger than 0.1; and
the distribution of the electromagnetic field is uniform.

The conditions for slab thickness, derived under these approximations, are hereinafter explained sequentially.

3.1 <Conditions for Light Confinement Factor>

The refractive index dispersion of photonic crystals is obtained by periodically arraying mediums with larger refractive index differences. It is therefore necessary to uphold a higher value of the light confinement factor in the Si slab in order to not lower the contrast.

First, the film thickness d of the Si slab D, normalized by the refractive index distribution, is defined by $$D = d\delta\epsilon^{1/2}\beta_0 \qquad (5)$$

$$\delta\epsilon = \epsilon_1 - \epsilon_2 \qquad (6)$$

$$\beta_0 = \frac{2\pi}{\lambda_0} \qquad (7)$$

where $\epsilon_1$, $\epsilon_2$ denote the dielectric constant of the slab and the clad, respectively, and $\lambda_0$ denotes the wavelength in vacuum.

Figure 11:
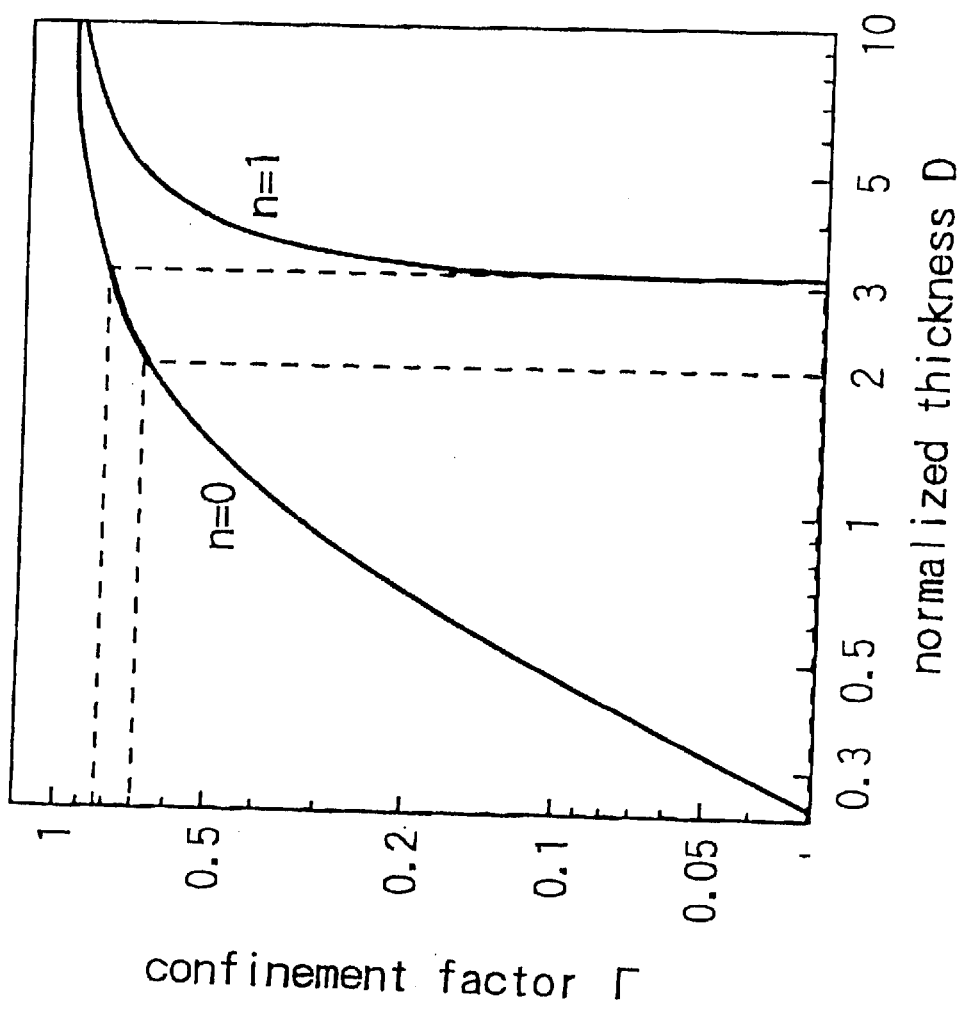
FIG. 11 shows the relation between the confinement factor $\Gamma$ and the normalized film thickness D for illustrating an embodiment of the present invention.

Using this D, the light confinement factor Γ into the slab shows the relation shown in FIG. 11.

It is noted that Γ (n=0) and Γ (n=1) denote the confinement factor of the basic mode and that of the first harmonics mode, respectively. With increase in the normalized film thickness D, confinement is increased gradually. At D=3.2, the higher harmonics are presented, with the mode being in the multiple mode state. From this relation, it is seen that, for obtaining a confinement factor not less than 70%, while maintaining the single mode, the following equation (8) is indispensable:

$$2.0 \leq D \leq 3.2 \qquad (8)$$

3-2 <Conditions for the Propagation Angle>

In a complete two-dimensional crystal, TE and TM represent eigenmodes of the respective fields, with there being no coupling nor approximation. However, in an actual system, it is necessary to take into account the beams disposed out of the propagation plane, so that, strictly, this coupling occurs to a certain extent. For suppressing this, it is necessary to align the propagation angle in the plane as far as possible.

The normalized propagation angle $\phi_{1/2}$, which is the propagation angle $\theta_{1/2}$ corresponding to reduction of the light intensity to one half, similarly normalized by the refractive index distribution, is defined by the following equation (9):

$$\Phi_{1/2} = \frac{\sin\theta_{1/2}}{\delta\varepsilon^{1/2}} \qquad (9)$$

Figure 12:
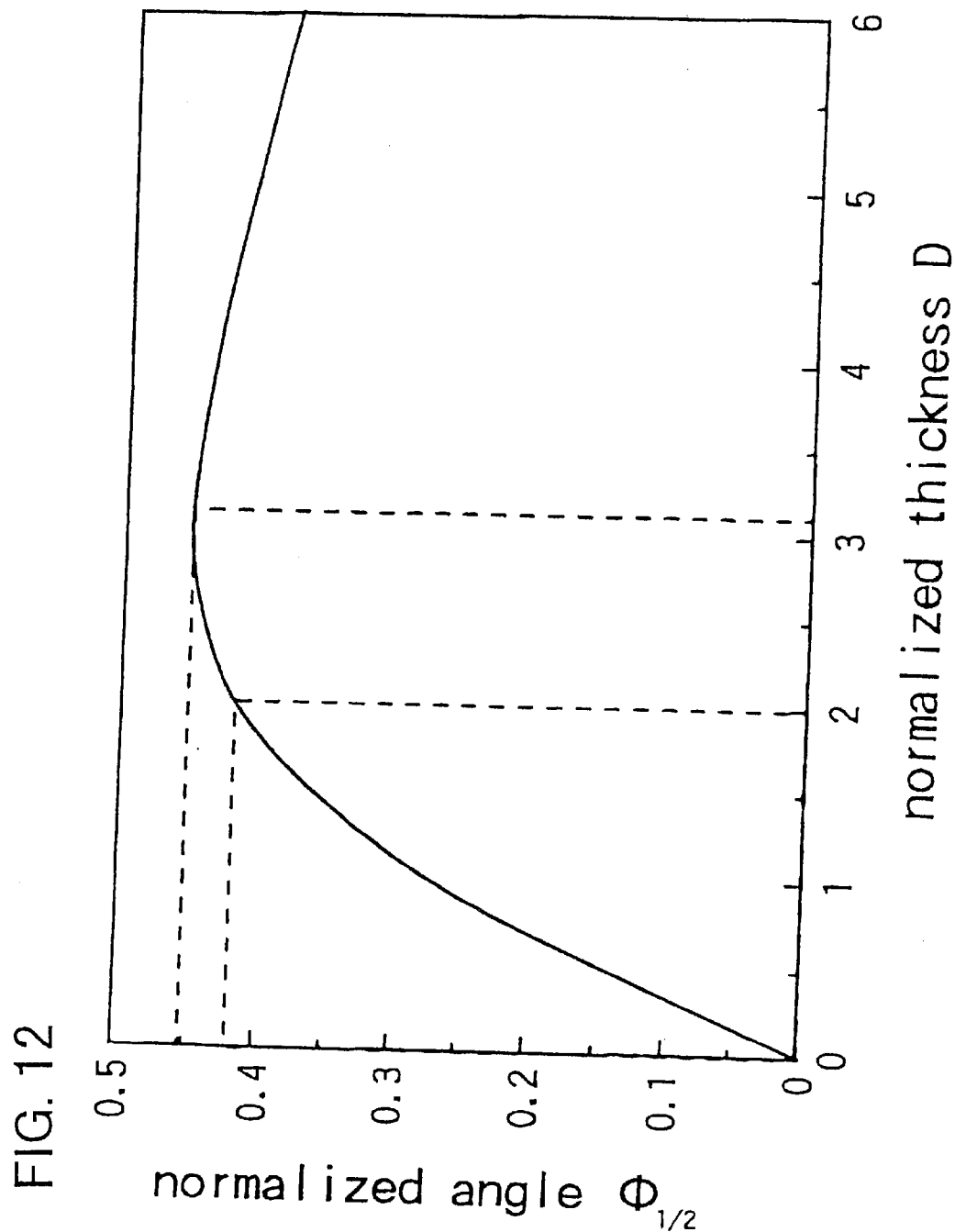
FIG. 12 shows the relation between the normalized propagation angle and the normalized film thickness D.
Figure 13:
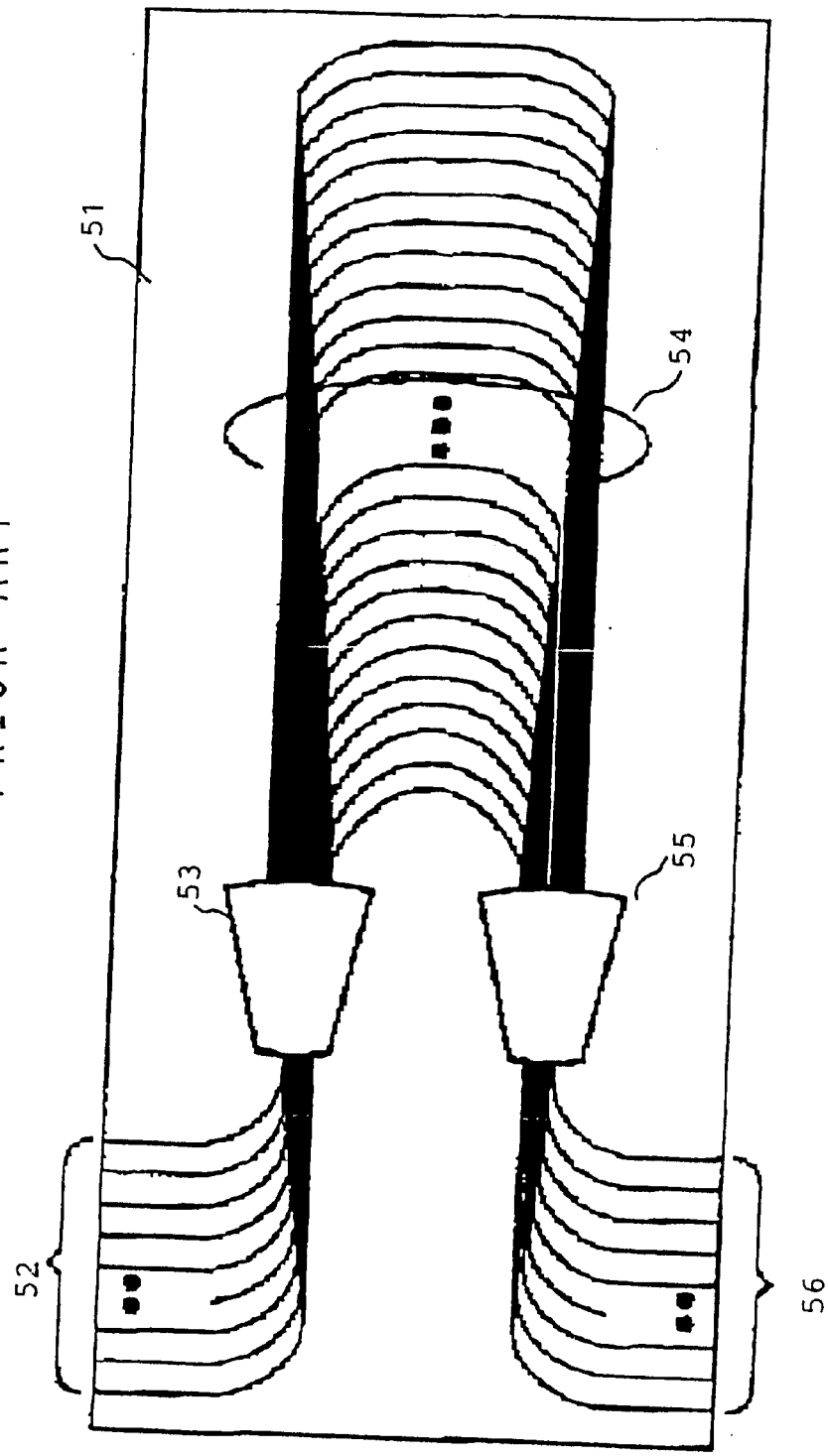
FIG. 13 is a schematic structure of an array waveguide lattice of a prior-art example.

The dependency of the normalized propagation angle $\phi_{1/2}$ on the normalized film thickness D is as shown in FIG. 12.

From the above conditions for light confinement (above equation (8)), D is 2.0 to 3.2, so that $\phi_{1/2}$ is given by the following equation (10):

$$0.42 \leq \phi_{1/2} \leq 0.45 \qquad (10)$$

Therefore, in order to set the actual propagation angle $\theta_{1/2}$ so as to be as small as possible, it is necessary to set $\delta\epsilon$ so as to be as small as possible. Since $\sin\theta_{1/2}$ represents the coupling factor of TE and TM waves, the following equation (11):

$$\delta\epsilon \leq 0.057 \qquad (11)$$

is obtained from the above equations (9) and (10), if $\sin\theta_{1/2}$ is limited to not larger than 0.1.

If the refractive index of $SiO_2$ at a wavelength of 1.5 µm is set to 1.46, the refractive index of the photonic crystal needs to be 1.48 or less. If, as explained subsequently, the refractive index can be designed to be equal to 1.48, the actual film thickness d is given by the following equation (12):

$$2.0 \, (\mu m) \leq d \leq 3.5 \, (\mu m) \tag{12}$$

4. <Effective Refractive Index of Photonic Crystal>

In a photonic crystal in which a Si substrate is bored in a cylindrical form with a triangular lattice array, the filling factor (ff) of air in a semiconductor is given by the following equation (13):

$$ff = \frac{\pi}{2\sqrt{3}} \left( \frac{d_{hole}}{p} \right)^2 \tag{13}$$

where $d_{hole}$ is the diameter of a hole and p is a lattice constant equal to 0.83 µm.

The effective refractive index $n_{eff}$, when assumed that the electromagnetic field is distributed evenly, is given by the equation (14):

$$n_{eff} = ff \cdot n_1 + (1-ff) \cdot n_2 \tag{14}$$

using the filling factor ff.

In the above equation, $n_1$ is refractive index of air equal to 1 and $n_2$ a refractive index of Si which is 3.24.

Thus, in order to meet the condition obtained above, that is $$n_{eff} \leq 1.48 \tag{15}$$

it suffices if $d_{hole}$ meets the following condition (16):

$$d_{hole} \geq 0.77 \, (\mu m) \tag{16}$$

From the foregoing, it is seen that the aspect ratio of the hole in Si should be not less than 2.6.

Another modified example of the present invention is explained. Although air through-holes are bored in Si, it is also possible to bury $SiO_2$ in holes or to form a medium of different refractive index, such as $SiO_2$, by a method, such as oxidation.

Other materials, such as GaAs or GaN, may be used for fabrication, in place of Si.

Alternatively, a sole clad may be provided on one side of the substrate, or the clad material may be different from $SiO_2$. Still alternatively, the substrate material may be directly formed on the clad by, for example, crystal growth, instead of by affixture.

Although the triangular lattice array is taken as an example in the above embodiment, it is also possible to use other lattice array, such as square lattice array. For improving deviation characteristics it is also possible to introduce non-uniformity intentionally into the lattice array.

The meritorious effect of the present invention are summarised as follows.

As discussed above, the present invention gives the following meritorious effects.

The first effect of the present invention is that small weight and size, high integration and high speed and is an improved transmission efficiency can be achieved.

The reason is that, in the present invention, the deflection angle can be enlarged and the size can be reduced, thus reducing the transmission distance and branching loss.

The second effect of the present invention is improved productivity.

The reason is that, in the present invention, the device size can be reduced to increase the number of devices obtainable from a wafer of the same surface area.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A wavelength dividing circuit for splitting a transmission path depending on wavelengths, comprising
   mediums with different refractive indices are periodically arrayed in an entire waveguide region to create wavelength dispersion characteristics not found in usual optical crystals, said wavelength dispersion characteristics being controlled to split the wavelength.

2. The wavelength dividing circuit as defined in claim 1 wherein the waveguide region is within a substrate, and
   wherein the wavelength dispersion characteristics are controlled by arranging materials with different refractive indices in a two-dimensional periodic array.

3. The wavelength dividing circuit as defined in claim 2 wherein the two-dimensional periodic array is in the form of a triangular lattice to create the "heavy photon" state.

4. The wavelength dividing circuit as defined in claim 2 wherein the difference in the refractive index is created by providing the substrate with a two-dimensional periodic array of through-holes.

5. The wavelength dividing circuit as defined in claim 4 wherein said through-holes are formed by etching.

6. The wavelength dividing circuit as defined in claim 3 wherein the difference in the refractive index is created by providing the substrate with a two-dimensional periodic array of through-holes.

7. The wavelength dividing circuit as defined in claim 2. wherein the waveguide substrate is sandwiched by materials of low reflective indices to control the propagation mode in a two-dimensional plane while maintaining mechanical strength.

8. The wavelength dividing circuit as defined in claim 1 wherein wavelength dividing is performed by using a "heavy photon" state exhibiting strong dispersion among said wavelength dispersion characteristics.

9. The wavelength dividing circuit as defined in claim 8 wherein the waveguide region is within a substrate, and
   wherein the wavelength dispersion characteristics are controlled by arranging materials with different refractive indices in a two-dimensional periodic array.

10. A wavelength dividing circuit, comprising a waveguide region having wavelength distribution anisotropy of the refractive index having a background medium; and a plurality of medium arranged two-dimensionally in the background medium and the plurality of mediums having a refractive index different from that of the background medium at a predetermined pitch so that the incident light to said waveguide region has its transmission path changed in dependence upon the wavelength.

11. A wavelength dividing circuit comprising a plurality of mediums having refractive indices different from that of a substrate are arranged in the form of a two-dimensional lattice as viewed from the surface of the substrate to endow the substrate itself with wavelength deflection characteristics so that the light incident on the substrate has its transmission path changed within said substrate in dependence upon the wavelength.

12. The wavelength dividing circuit as defined in claim 11 wherein said mediums of different refractive indices provided in said substrate are arranged periodically two-dimensionally at a predetermined pitch.

13. The wavelength dividing circuit as defined in claim 11 wherein a lateral side of said substrate serves as an incident surface inclined at a pre-set angle relative to said incident light, and wherein an opposite lateral side of the substrate serves as an outgoing surface.

14. The wavelength dividing circuit as defined in claim 11 wherein the thickness of said substrate is set so that light signals are sufficiently confined in the substrate and so that the proceeding direction of the light signals is not significantly deviated from the substrate surface.

15. The wavelength dividing circuit as defined in claim 11 wherein said mediums of different refractive indices provided in said substrate are air in through-holes passing from an upper surface to a lower surface of said substrate or members of a different refractive index from that of the substrate charged in said through-holes.

* * * * *